United States Patent [19]

Pettit et al.

[11] 4,131,918
[45] Dec. 26, 1978

[54] PROVIDING CONTROL SIGNALS FOR MACHINE OPERATIONS

[75] Inventors: Donald Pettit, Isham; Stephen G. Abbott, Market Harborough, both of England

[73] Assignee: The Shoe and Allied Trades Research Association, Northamptonshire, England

[21] Appl. No.: 506,297

[22] Filed: Sep. 16, 1974

[30] Foreign Application Priority Data

Sep. 19, 1973 [GB] United Kingdom ............... 43984/73

[51] Int. Cl.$^2$ ............................................. G11B 25/00
[52] U.S. Cl. ......................................... 360/1; 83/367; 90/13 C; 234/63; 346/33 MC
[58] Field of Search ................ 360/1, 77; 346/33 MC; 318/577, 587, 653; 355/28, 29; 235/449; 180/98; 234/63; 90/13 C, 64; 364/474; 83/367

[56] References Cited

U.S. PATENT DOCUMENTS

| | | | |
|---|---|---|---|
| 2,735,335 | 2/1956 | Shaw | 355/28 |
| 3,307,162 | 2/1967 | Fink | 360/1 |
| 3,409,853 | 11/1968 | Guerth | 360/1 |
| 3,486,607 | 12/1969 | Hacker et al. | 360/1 |
| 3,575,255 | 4/1971 | Wickstrom | 180/98 |
| 3,609,678 | 9/1971 | Fayling | 180/98 |
| 3,628,624 | 12/1971 | Wesener | 180/98 |

FOREIGN PATENT DOCUMENTS 2284930  9/1976  France ........................................ 360/1

*Primary Examiner*—James W. Moffit
*Attorney, Agent, or Firm*—Lerner, David, Littenberg & Samuel

[57] ABSTRACT

There is described a method of guiding a machine as it moves relative to a surface, which is preferably the surface of a workpiece on which the machine is working, by selectively magnetizing a layer of magnetic material provided at or close to the surface so as to define a path of movement, producing guidance signals during the relative movement by detecting the selective magnetization, and using the guidance signals to automatically guide the relative movement, so that the defined path is followed. Data other than guidance data may be provided on the layer by selective magnetization.

44 Claims, 12 Drawing Figures

PROVIDING CONTROL SIGNALS FOR MACHINE OPERATIONS

FIELD OF THE INVENTION

This invention relates to providing control signals for machine operations. In a preferred aspect, it concerns the automatic guidance of workpieces through a machine and conversely to the guidance of a machining tool or device over a stationary workpiece or fabrication. The invention also relates to automatic control of machine settings and other control parameters, preferably simultaneously with guidance. The invention further relates to workpieces or workpiece materials or other fabrication to accord with the requirements of the automatic processes.

BACKGROUND TO THE INVENTION

Considerable work has been done in the prior art in providing automatic machines. In some cases it is desirable to provide a machine with instructions concerning operations of the machine on a workpiece, and numerically controlled machines are well known for effecting this. In other situations, it is desirable for there to be provided automatic guidance means for guiding workpieces through a machine or for guiding a machine over a surface, such as a floor. Numerous attempts have been made in the prior art to provide such automatic guidance systems. For example, U.K. Patent Specification No. 1,063,001 describes a sewing machine in which a cam controlled linkage is used to guide the workpiece along a desired path through the machine. This arrangement requires a special cam to be constructed every time the path of the workpiece is required to be changed. Thus this system is rather impractical and lacks versatility.

It has also been proposed to guide workpieces through a machine by sensing the edge thereof, so that operations can be carried out on the workpiece along a line parallel to the edge. Mechanical sensors have been proposed for feeling the edge, and photoelectric detectors have also been proposed for sensing the edge. Examples of such systems can be found in U.K. Patent Specification Nos. 1,205,290; 962,160; 1,002,283; 1,002,281; and 989,874; and U.S. Patent No. 3,925,713 also relates to such a system. Also reference may be made for further examples of such systems to the "Journal of the Apparel Research Foundation", 1970, Vol. 4, No. 2, Pages 1 to 4 and issue No. 4 of the same volume, at pages 17 to 22. These articles have been abstracted in "World Textile Abstracts" 1971/247 and 1972/916. At the time of execution of this application, the inventors have access only to the abstracts but it appears from consideration thereof that the systems described involve a photoelectric line follower which responds to a line drawing, which drawing has to be replaced in the machine each time the path to be followed is to be changed.

Thus, the edge following systems are generally insufficiently versatile for widespread application, and the photoelectric line following system is prone to errors since the operator of the machine has to ensure that the line drawing provided to the machine is the correct one for the particular workpiece to be operated upon.

There therefore exists a need for an improved control system for machines, especially in industries where the finished product is an assembly of two or more parts of variable and irregular shape. This is exemplified by the footwear and garment industries in which irregularly shaped components are cut from a variety of materials, generally in flexible sheet form, and are converted into useful products by a number of assembly and other operations. Much of the assembly depends upon the combining of components at a common line or point by such means as sewing, stapling, welding or sticking with adhesive. At present the components are generally located and guided through the combining machine manually. Thus in the closing of shoe uppers by sewing together cut components the latter are guided by hand through a sewing machine and seamed at a premarked line. This operation has a high labour content and cost, and requires skill and dexterity on the part of the operative. The need to cater for both a wide variety of styles and many sizes within each style leads to relatively small production runs of each individual item. This renders many well known automatic systems, or aids to semi-automatic production such as those based on jigs or templates, unattractive for practical and economic reasons.

It has also been considered, though possibly not published, that lines of magnetic ink could be provided on workpieces for magnetic detection by a guidance system provided in a machine through which the workpiece is to be automatically guided. This proposal, however, would generally involve a visible line on the workpiece, which would be unacceptable in many industries, especially the shoe industry.

THE INVENTION

Accordingly, the object of the invention is to provide an improved system in which the above disadvantages are alleviated In an aspect, the invention involves the provision of a layer of magnetic material in the region of the surface of a workpiece or other member which is to move relative to a machine, or relative to which a machine is to move, and the recording on such layer of data for controlling the machine. The data may be in the form of a line to be used for guiding the machine and/or it may comprise instructions for controlling other operations on the machine, such as starting and stopping of the machine. Thus, a process according to an embodiment of the invention depends upon the detection of lines, points or areas of magnetism provided in the workpieces to operate the guidance and/or other control mechanisms. This requires that the materials of the workpiece contain or are provided with a sufficient content of a magnetisable substance such as a ferromagnetic substance to enable a guide line and/or other data to be recorded. This may be present as a continuous layer or a dispersion of discrete particles, over or within all or part of the area of the workpiece or selected parts of any shape of the area of the workpiece or other member.

Although the invention has wide application, a preferred embodiment involves the utilisation of the invention in the shoe industry. The description of embodiments of the invention to be given with reference to the accompanying drawings will, therefore, be directed to an application in the shoe industry.

BRIEF DESCRIPTION OF THE DRAWINGS

The invention is described further by way of example with reference to the accompanying drawings, in which.

OVERALL PROCESS

Figure 1:
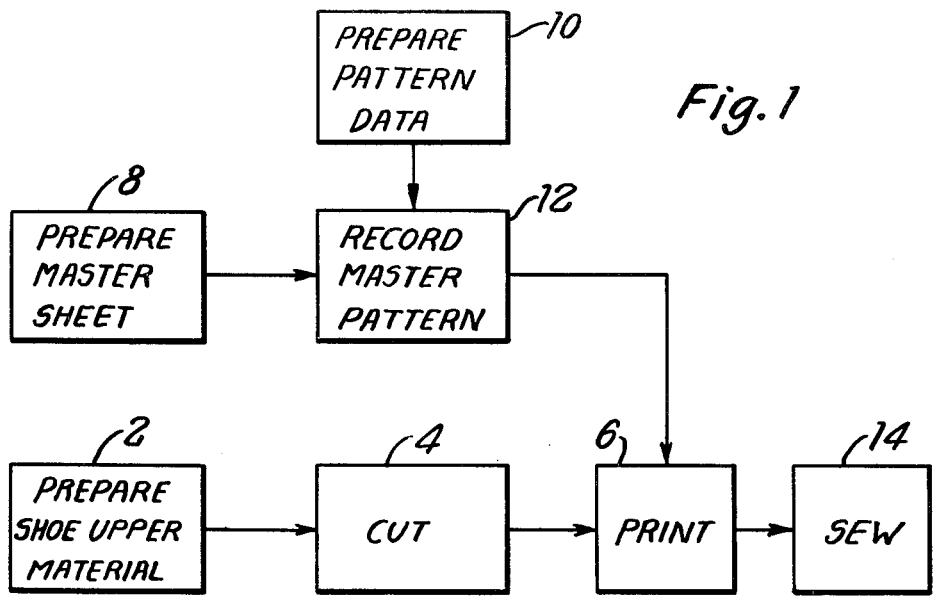
FIG. 1 is a flow diagram illustrating a process according to an embodiment of the invention.

The embodiment of the invention illustrated in the drawings concerns the formation of lines of stitching on components of shoe uppers, in a shoe making process. Such stitching is carried out on a sewing machine equipped with automatic guidance apparatus which responds to magnetic lines recorded on the components along the lines on which the stitches are to be formed.

With reference to FIG. 1, at step 2 the shoe upper material, while still in sheet form, is prepared for use in the process by incorporating therein a layer of magnetic material. Other operations may be carried out on the shoe upper material at step 2, for example the coating of the material with a lacquer of the desired colour. At step 4, the sheet material is cut, in a conventional way, into the required components shapes, and at step 6 patterns of magnetic lines are recorded on the components by an operation analogous to "printing" using a master.

At step 8, a sheet of flexible magnetic material is prepared for use as the master and at step 10 data representing the lines along which the stitching is to be formed on the components is prepared. This data is in the form of a series of co-ordinates of points along these lines. At step 12, magnetic lines are recorded on the master prepared at step 8, utilising the data prepared at step 10, so that the master is then ready for use in printing step 6.

After the printing step has been completed on the components, they are transferred to a sewing machine and, at step 14, the sewing operation is automatically carried out using the magnetic lines as guide lines, as mentioned above.

Each of the steps illustrated in FIG. 1 will now be described in more detail.

PREPARATION OF SHOE UPPER MATERIAL — STEP 2

The formation of members having a ferro-magnetic layer is a well established art, and recording media in the form of tapes, discs and cards are in widespread use. The medium normally consists of a suitable smooth substrate on which is coated a dispersion of a finely divided magnetic material in a binder. The magnetic material is usually acicular or spherical particles of gamma ferric oxide ("brown iron oxide"), ferrosoferric oxide ("black iron oxide"), iron, nickel or chromium oxide and the binder is typically a polymeric resin such as PVC - PVA, copolymer or nitrocellulose. We have found that coatings of this type may be incorporated into footwear upper materials. These are typically leather, a natural fibrous material to which is usually applied natural or synthetic resinous finish layers, or synthetic materials normally consisting of a woven or non-woven fibrous substrate coated with solid or microporous polymer layers, for example of PVC or polyurethane and finishes. The leather finishes and the coatings of synthetic materials are generally pigmented. It is therefore possible to introduce magnetic material, which may be inherently coloured, as a sub-surface layer, or dispersed within a finish or coating, without affecting the pigmentation of the finished product.

Leather is usually finished on the grain surface by applying aqueous emulsions or solvent based solutions or combinations of these. The magnetic coating may be applied by spray, brushing, doctor-blade coating, curtain coating or other suitable means, either to the grain of the leather or between application of any pair of the normal finish coats. It is preferable to have one or more pigmented finish layers applied after the magnetic layer to mask the colour of the magnetic agent. The particles of the latter may be up to 10 $\mu$m in diameter or largest dimension on average, but preferably less than 1 $\mu$m for acceptable performance and smoothness of appearance of the coating. The dry coating weight may be 1 to 50 g/m$^2$, and preferably 10-20 g/m$^2$. Thinner coatings may lead to poor recording characteristics, while thicker coatings may have poor appearance or flexing resistance. The coating may contain 10 to 90% by weight of magnetic agent and correspondingly 90 to 10% of binding material. The preferred proportion of magnetic agent is 50 to 75% coatings used in magnetic recording tapes, for example, normally contain 70-75% by weight of magnetic material. In the present application a rather lower content may be used, as ability to accept recorded signals of a wide range of frequencies, such as the audio frequency range, is not essential. In addition, the higher resin content contributes to the smoothness and mechanical properties of the coating. To avoid the need for an additional coating the magnetic material may alternatively be dispersed in one of the normal leather-finishing solutions, adjusting the solvent or water content as necessary. The polymeric material present in the finish solution acts as the binding agent for the magnetic material. The preferred content of magnetic material in the dry finish and the preferred dry coating weight are the same as for the separate magnetic coating layer previously mentioned.

Figure 2:
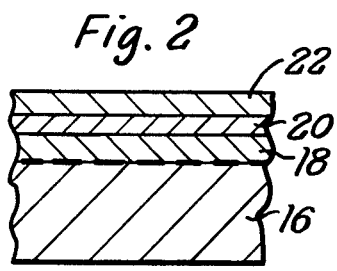
FIG. 2 is a cross-section through a piece of leather shoe upper material prepared in one of the steps of the process of FIG. 1.

FIG. 2 illustrates one example of the formation of such a magnetic layer on leather, in which the magnetic layer is beneath a coloured lacquer coating. As shown in FIG. 2, the leather comprises layer 16, which is the corium, the grain layer 18. The layer 20 is of base or filler material and incorporates the magnetic material, and layer 22 is the coloured lacquer. Although FIG. 2 is not to scale, and is much enlarged, it does give a general indication of the relative thicknesses of the various layers.

Magnetic material may be incorporated into synthetic materials as a layer between the substrate and coating, between two successive coating layers or between the coating and a pigmented surface finish. Alternatively, the magnetic material may be dispersed within a polymeric coating layer or finish. The coating weights necessary resemble those for leather, except that if the magnetic layer is beneath or between thick coating layers a greater magnetic coating weight may be necessary for acceptable signal strength.

Figure 3:
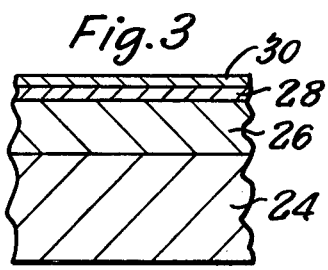
FIG. 3 is a section, similar to FIG. 2, but showing a synthetic shoe upper material.

FIG. 3 illustrates an example of a synthetic shoe upper material according to this embodiment of the invention. Layer 24 is a woven fabric forming the backing. Layer 26 is the fabric pile. Layer 28 is a layer of bonding adhesive in which the magnetic material is incorporated, and layer 30 is a polyurethane film.

As an alternative to incorporating the magnetic material into an adhesive coating or an adhesive film as shown in FIGS. 2 and 3, the magnetic material could be coated on the flesh surface of the leather or other upper material such as poromeric upper material, or could be dispersed within the upper material by drumming or, in the case of leather, the tanning agent used could be chosen to provide the required magnetic material dispersed in the leather. The adhesive film may be subsequently removed and may incorporate a separate substrate such as paper.

CUTTING — STEP 4

The cutting of the shoe upper material prepared as described above in connection with step 2 may be carried out in any suitable manner. Conventional machines utilising knives may be used for the cutting operations, or, as one alternative, machines utilising water jet cutting techniques may be employed. Since cutting methods are well known in the art, further description is unnecessary.

PREPARATION OF MASTER SHEET — STEP 8

Figure 4:
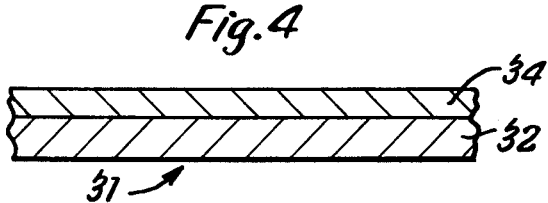
FIG. 4 is a section through a magnetic sheet prepared in another step of the process of FIG. 1, on which a master pattern is to be recorded.

In the embodiment illustrated in the drawings, the master sheet is flexible. As shown in FIG. 4, it comprises a substrate 32 having thereon a magnetic coating 34. The substrate 32 may be a similar or different material to the copy, carrying a magnetic coating. Any rigid or flexible non-magnetic material is suitable for the substrate, especially paper or flexible polymeric materials such as PVC. The coating 34 may be the same or similar to those previously described, i.e. a dispersion of particulate ferromagnetic material in a binder. If a high signal strength is necessary the magnetic coating weight may be increased to several times that normally used on the copy, e.g. to 20–100 g/m$^2$, and a higher strength recording field used. A magnetic material of higher magnetic susceptibility may also be advantageous. In addition, the efficiency of the printing process (step 6) is enhanced if the magnetic material in the master coating has a higher coercivity than that in the copy. The life of the master may be extended by lacquering the surface of the coating layer to protect the latter from damage.

PREPARATION OF PATTERN DATA — STEP 10

An XY plotter is used in step 12 for recording the pattern of magnetic lines on the master prepared in step 8. Accordingly, the data prepared at step 10 will consist of co-ordinates defining the lines to be magnetised on the master, which therefore will also define the position at which magnetic lines will be formed on the shoe upper component at step 6. This data may be provided in any conventional form, for example on magnetic or punched tape or punched cards, suitable for feeding to an XY plotter. Since methods of preparing co-ordinate information in this form are well known per se, further description of this step is unnecessary.

RECORDING MASTER PATTERN — STEP 12

Figure 5:
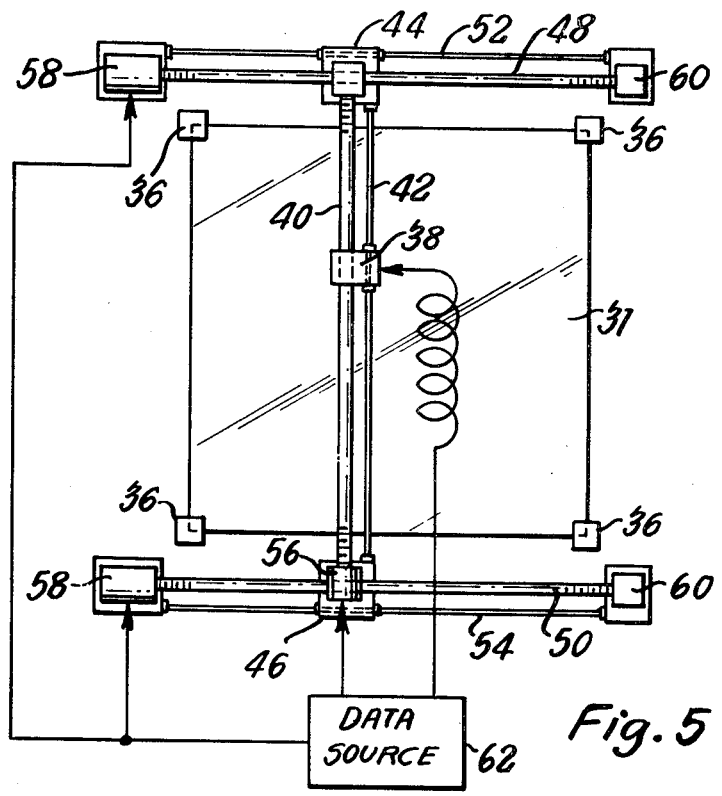
FIG. 5 is a diagrammatic plan view of an apparatus for recording a pattern on the sheet of FIG. 4 at yet a further step in the process of FIG. 1.

As shown in FIG. 5, the sheet 31 prepared in step 8 is mounted in an XY plotter and held in position by clamps 36. A carriage 38 carrying an electromagnetic transducer (not shown in FIG. 5) is mounted on a threaded rod 40 and guide bar 42 in a convention manner such that when the rod 40 is rotated, the carriage 38 is caused to slide along the guide bar 38. The rod 40 and bar 42 are carried at their respective opposite ends by further carriages 44 and 46. The carriages 44 and 46 are mounted, in a manner similar to the carriage 38, on threaded rods 48 and 50 and guide bars 52 and 54 so that when the rods 48 and 50 are rotated in unison the carriages 44 and 46 are transported at the same speed along the guide bars 52 and 54. An electric motor 56 is mounted on the carriage 46 for rotating the rod 40, and electric motors 58 mounted on the machine frame are provided for rotating the rods 48 and 50. The ends of the rods 48, 50 and guide bars 52, 54 opposite to the electric motors 48 are mounted in housing 60 secured to the frame (not shown) of the machine.

A data source 62, for example a magnetic tape or punched tape reader, or punched card reader, which is supplied with the data prepared at step 10, controls the motors 46 and 58 and the transducer mounted on the carriage 38. Operation of the motors 58 thus controls the X co-ordinate of the position of the carriage 38 and operation of the motor 46 controls the Y co-ordinate thereof. Thus, the transducer may be caused to move over the required lines to be magnetised and may be turned on and off as required, under control of the data source 62. Since XY plotters are well known per se, further detail of the way in which the movement of the transducer is controlled is unnecessary.

Figure 6:
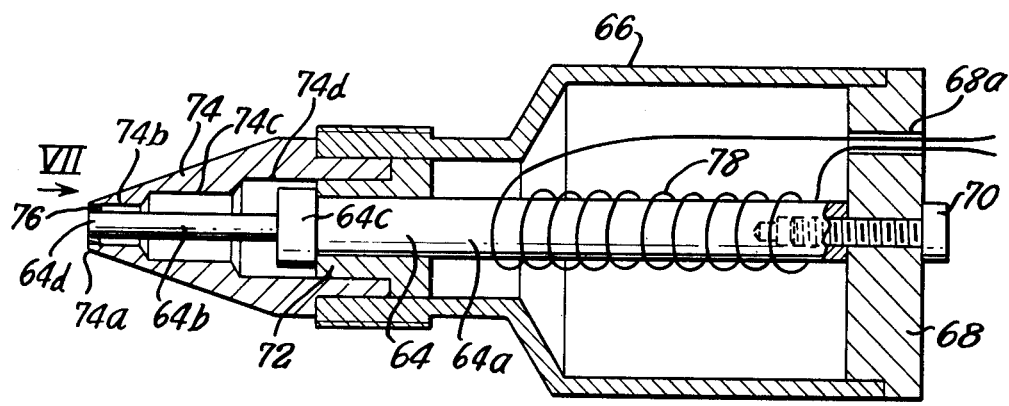
FIG. 6 is a sectional view through an electromagnetic transducer incorporated in the apparatus of FIG. 5.
Figure 7:
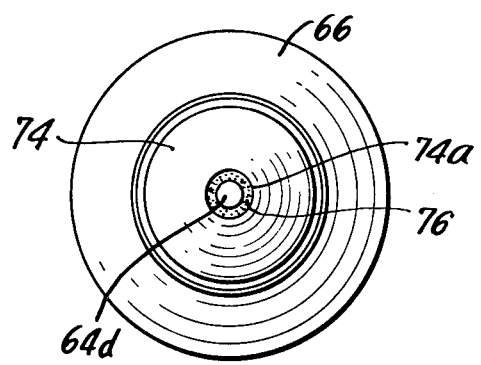
FIG. 7 is a view of the transducer of FIG. 6 taken in the direction of the arrow VII shown in FIG. 6.

The transducer itself, however, is novel. As shown in FIGS. 6 and 7, it comprises a solid core member 64 of circular cross-section and formed of a suitable material useful as a magnetic core in a transducer, for example soft iron. The member 64 includes cylindrical portions 64a and 64b of which the former is of larger diameter than the latter. The portion 64a is located within a housing 66 and is secured therein by means of a circular end plate 68 to which the portion 64a is fixed by a bolt 70 and which is a friction fit in one end, which is the larger end, of the housing 66, and a spacer 72 mounted in the smaller end of the housing 66. The cover 68, bolts 70 and housing 66 are all made of the same material as the member 64. The spacer 72 is made of a non-magnetic electrically insulating material, such as a synthetic plastics material. A collar portion 64c provided on the member 64 engages one end of the spacer 72 to assist in maintaining the parts in their proper disposition relative to each other.

A conical member 74, also made of the same material as the core member 64 is mounted on the smaller end of the housing 66 and is in tight frictional engagement therewith and with the spacer 72. The member 74 is hollow and contains the portion 64b of the member 64, the free end 64d of which is disposed within an opening 74c at the tip of the member 64. There is a circular gap between the end 64d of the member 64 and the member 74, and this is filled with epoxy resin 76, which is non-magnetic material, to hold the end 64 central within the opening 74c.

An electric coil 78 is wound around the portion 64a of the member 64 and located within the housing 66, and the ends of the coil 78 are led out of the housing 66 through an opening 68a in the cover 68.

Accordingly, when the coil 78 is energised with alternating current, an alternating magnetic field is produced in the gap between the end 64d and the member 64, and leakage flux from such field is used to record the magnetic lines on the sheet 31. To ensure that the field is concentrated at the aforesaid gap as much as possible, rather than within the body of the member 74, the interior of the member 74 is stepped at 74b, 74c and 74d to maintain the maximum spacing between the portion 64b and the interior surface of the member 74, other than at the gap.

As an example, the width of the circular gap (i.e. the spacing between the end 64d of the member 64 and the inside periphery of the opening 74a,) may be 0.002 inches, and the depth of the gap (i.e. the length of the gap as measured axially) may be 0.020 inches. Other dimensions of the transducer may be approximately in the proportions illustrated in FIGS. 6 and 7.

Figure 8:
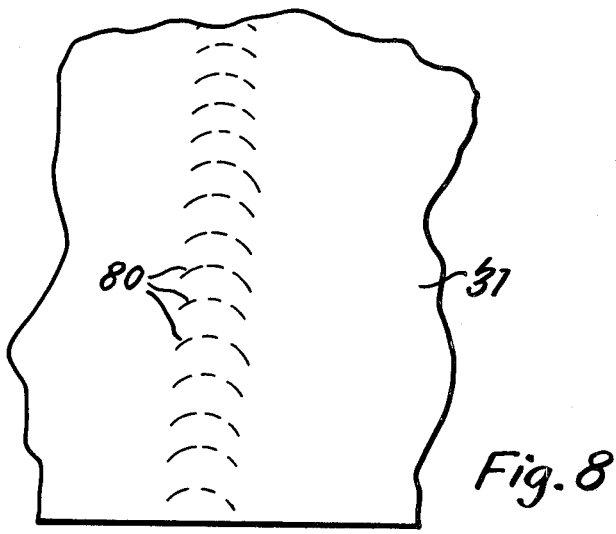
FIG. 8 is a partial plan view of the sheet of FIG. 4 showing part of the master pattern recorded thereon using the apparatus of FIGS. 5 to 7.

Thus, as the XY plotter is operated, high frequency alternating current is supplied to the coil 78 when it is desired to record a magnetic line. As shown in FIG. 8, the resulting line consists of a series of part circular or semi-circular peaks of magnetisation 80 of one polarity, the curvature of which depends upon the dimensions of the gap between the tip of member 74 and end 64d of member 64, and the spacing between which depends upon the frequency of the current supplied to the coil 78 and the speed at which the transducer is moved. The advantage of the transducer of FIGS. 6 and 7 is that, since it employs a circular gap, the form which the magnetic line takes is identical regardless of the direction in which the transducer is moved by the XY plotter without any necessity to rotate the transducer. If a conventional transducer were used, in which the opposite poles of the magnetic core form a straight gap, the form of recorded line would change as the transducer was moved round a curved path unless the transducer were also rotated to keep the two poles in the same orientation relative to the path. A further advantage of the magnetic line recorded by this type of transducer (see FIG. 8) is that it provides a more consistent signal at varying reading heads/line angles.

It is desirable to use as high a frequency as possible during recording. Also, to ensure adequate flux leakage especially when the magnetic layer is beneath the top layer of the shoe upper material as shown for example in FIGS. 2 and 3, it is desirable for the gap to be as wide as possible. These two requirements are conflicting in that the wider the gap the lower the frequency it is necessary to use. They must therefore be balanced to provide optimum results in a given situation.

It should be understood that although the transducer illustrated in FIGS. 6 and 7 is preferred for use in the XY plotter, other forms of transducer may be employed. Also, means other than an XY plotter may be used for carrying out the step 12. For example a matrix comprising a large number of magnetic recording heads may be used. The sheet 31 is contacted with these heads which are then selectively energised to provide the required pattern of magnetisation. The heads may be of the type having both magnetic poles disposed at the same side of the material. If desired, an alternative type of head may be used, in which the material is placed and moved in between the two magnetic poles.

Such a matrix or the XY plotter, may be controlled directly from a computer instead of from data bearing elements such as punched or magentic tape or punched cards as has been described.

PRINTING OR TRANSFER — STEP 6

Where many identical workpieces require an identical pattern of magnetisation it is economical and convenient to use a contact printing process for producing duplicates from the master copy. Such a process is well known in the recording industry for producing multiple copies of recorded tapes as described for example in the article entitled "Duplicating Magnetic Tape by Contact Printing" by Marvin Camras and Robert Herr which appeared in the Journal "Electronics" of December 1949 at pages 78 to 83. In applying such process to the present invention, the master copy is recorded by a direct method such as those previously discussed so that the intensity of magnetisation (and hence the intensity of the recorded signal) is at least equal to, and typically several times greater than, the desired intensity on the printed copy. The master is then placed in face-to-face contact with the copy, so that the magnetic coating layers of master and copy are in as close proximity as possible. Normally this means that the outer finish or coating layers will be in contact. The contacted materials are drawn through an alternating magnetic field which may be of high frequency (the "transfer field"), usually acting substantially normal to the plane of the magnetic coatings, whereupon the pattern of magnetisation in the master is induced in the copy. Alternatively the materials may be kept stationary and subjected to a moving magnetic field of the same type, which passes over or around the materials while they are in contact. The master may be used for producing large numbers (many hundreds or thousands) of copies with no or negligible loss in its own recorded signal strength. The master may also be erased and re-used at will for producing different patterns of magnetisation in subsequent batches of copies.

The transfer field preferably has a peak strength greater than 200 oersted and preferably greater than 500 oersted. The field strength must be carefully adjusted to give optimum signal transfer without erasure of the master.

The frequency of the transfer field may vary from mains frequencies, e.g. 20–60 Hz to frequencies in the MHz range. The frequencies usually employed range from 0.5 to 500 KHz. For an efficient signal transfer the master and copy in contact should be in the transfer field for a number of cycles of maximum strength, and very many cycles (preferably a hundred or more) of gradually decreasing strength. At low frequencies the relative movement of contacted materials in the field (or vice versa) must therefore be slow e.g. 1–10 cm/sec. at 50 Hz. Higher frequencies permit faster production of copies as well as more efficient signal transfer. Since the strength of a magnetic field falls off at edge regions, the aforesaid gradually decreasing field strength to which the contacted materials are subjected may be achieved due to the movement of the contacted materials through the field zone. However, where the contacted materials are to be held stationary relative to the field zone during the copying process, the aforesaid gradual decrease of field strength may be achieved by actually decreasing the peak magnitude of the alternating field.

There are many ways of arranging master, copies and magnetic transfer field. One possibility is illustrated in FIG. 9 of the accompanying drawings.

Figure 9:
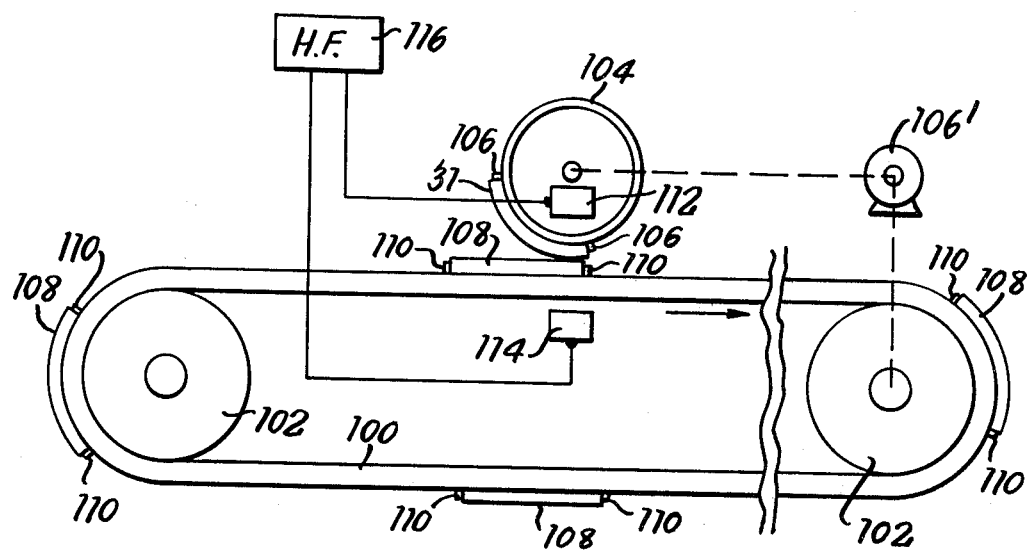
FIG. 9 diagrammatically illustrates, in side view, apparatus for transferring the master pattern formed on the sheet of FIG. 4 onto shoe upper material as shown in FIG. 2 or FIG. 3.

In FIG. 9, a conveyor belt 100 mounted on rollers 102 and a drum 104 are driven in synchronism with each other by a common motor 106'. The master sheet 31 is mounted on the drum 104 in a precisely determined position as determined by locator elements, for example adjustable pegs or clamps, 106 shown only diagrammatically. Shoe upper components 108 cut out at step 4 are positioned on the conveyor belt at precisely determined positions and are located thereon by suitable locator means which may again be in the form of clamps or pegs, preferably adjustable in position on the belt to accommodate different shaped components, which locator means are again indicated diagrammatically in FIG. 9 and are designated by the reference number 110. The spacing between the components 108 on the conveyor belt 100 is such that, as the belt 100 and drum 104 are driven, a fresh component 108 is brought into contact with the sheet 31 at each rotation of the drum 104, the synchronisation of the drum 104 and belt 100 being such that proper registration between the sheet 31 and each component 108 is provided.

The drum 104 and belt 100 are made of non-magnetic material. An electromagnetic transducer having one pole 112 positioned within the drum 104 and the opposite pole 114 positioned beneath the belt 100 adjacent the drum 104 is energised by a high frequency generator 116 to provide the transfer field. Alternative systems may use a transporting drum or belt of magnetic material as a pole.

Of course other methods of bringing the master sheet 31 and components 108 into registration are possible. Conveyor means other than a belt may be used. Instead of a continuously moving conveyor, reciprocating conveyor means may be provided on which the components 108 are moved in a first direction from a position at which they are loaded on to the conveyor means to a position in contact with the master sheet for effecting the printing operation, and then moved in the opposite direction, back to the first position, for removal of the component with the magnetic pattern formed thereon. In this case, the master sheet may, for example, be attached to a cylindrically curved surface similar to the drum 104, but arranged to oscillate about its axis.

ALTERNATIVE METHOD OF RECORDING PATTERNS OF COMPONENTS

As a further alternative, instead of using a master of the form which has been described, namely a magnetic record on the master sheet of the required pattern, formation of the required pattern on multiple components can be achieved in different ways. For example, all areas of the component, except those to be magnetised, are shielded from the effects of magnetic fields before passing the copy through a suitable field extending over the whole area of the component, or vice versa. The shielding may conveniently be carried out by placing a sheet of suitable material, e.g. iron, over the component, the sheet having cut-outs or slots in the areas or along the lines to be magnetised. The same shielding stencil can be used in the production of very many identical copies. As the recording field will be attenuated or deflected at the edges of the cut-outs or slots these need to be rather larger or wider than the required magnetic area or line width.

If large numbers of components are not to be formed with the same magnetic pattern thereon, it may be convenient not to use a master at all. The magnetisation can then be achieved by a variety of different means directly. For example any of the means described for producing the master sheets 31.

STITCHING — STEP 14

Stitching along the lines defined by the magnetic lines formed at step 6 is carried out on a sewing machine as described with reference to and illustrated in copending U.S. Patent Application Serial No. 413,426, now U.S. Patent No. 3,925,713 to the complete specification filed in British Patent Application No. 51880/72 and now U.S. Patent No. 3,925,713 to German Patent Application No. P 2356118.4, published as Offenlegungsschrift 2,356,118, the contents of which are incorporated herein by reference, modified by the replacement of the edge sensing probe with a magnetic line sensing probe illustrated in FIGS. 10 and 11 of the accompanying drawings. In particular, it is preferred that the embodiment of FIGS. 1 to 5 of the aforesaid co-pending applications be used.

Figure 10:
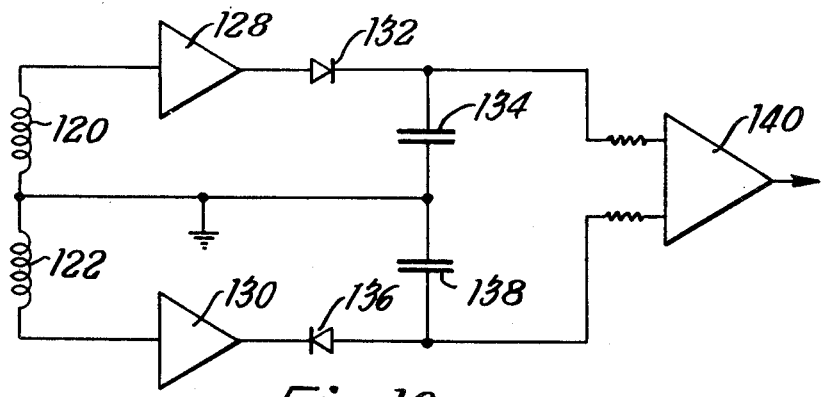
FIG. 10 is a circuit diagram of an electromagnetic pick-up device employed in a further step of the process of FIG. 1 for reading the magnetic patterns formed on the material of FIG. 2 or FIG. 3 in the step of FIG. 9.
Figure 11:
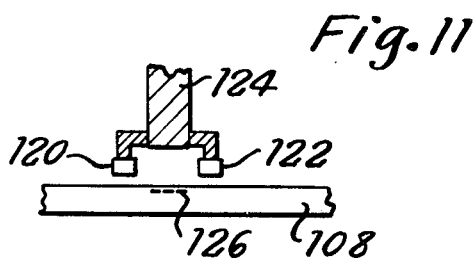
FIG. 11 is a diagram of a probe included in the device of FIG. 10, showing its relationship with a workpiece.

As shown in FIGS. 10 and 11 of the accompanying drawings, the magnetic probe comprises two magnetic pick-ups 120 and 122, each of which may be of a conventional kind, mounted on a support 124 at spaced apart positions which are such that, in use, the pick-ups 120, 122 are disposed on opposite sides of a magnetic line 126 to be followed, which line was formed on the component 108 during the printing process described with reference to FIG. 9.

In FIG. 11, the direction of movement of the component 108 relative to the probe is perpendicular to the plane of the paper. Thus, so long as the pick-ups 120 and 122 remain equally spaced from the magnetic line 126, alternating voltages of equal amplitude will be generated by the pick-up. These voltages are amplified by amplifiers 128 and 130 which receive the outputs of the pick-ups 120 and 122 respectively. The output of amplifier 128 is rectified by a diode 132 and smoothed by a capacitor 134 to provide a positive DC signal representative of the amplitude of the signal produced by the pick-up 120. The output of amplifier 130 is rectified by a diode 136 connected in the opposite sense to the diode 132 and smoothed in a capacitor 138 to provide a negative DC voltage representative of the amplitude of the signal produced by the pick-up 122. The positive and negative signals are supplied to respective inputs of a summing amplifier 140 so that, when the positive and negative voltages are equal, the output of the summing amplifier is zero, indicating that the pick-ups 120 and 122 are equally spaced on either side of the magnetic line 126.

If the position of the magnetic line 126 relative to the probe should vary, for example due to a curve in the line being approached, then one of the pick-ups 120, 122 will effectively move closer to the magnetic line and the other will effectively move further away with the result that the amplitude of the signal produced by one pick-up will decrease and the amplitude of the signal produced by the other will increase. The result of this will be that the positive and negative voltages supplied to summing amplifier 140 will no longer be equal so that this amplifier will produce at its output a voltage whose magnitude is representative of the lateral displacement between the probe and the magnetic line and whose sign is indicative of the direction of such displacement. The circuits ar preferably designed so that the voltage at the output of the summing amplifier 140 is proportional to the displacement and thus this voltage can be directly supplied to the analogue computer 36 of FIG. 3 of the aforesaid co-pending patent application. The embodiment of FIGS. 1 to 5 of said patent application will therefore operate to cause the magnetic line to be followed and a line of stitches to be sewn either along the magnetic line or parallel thereto according to whether the needle position is in alignment with the magnetic probe or displaced to one side thereof.

It will furthermore be understood that in the event of the signal from both the pick-ups 120 and 122 being zero, indicating that the probe is not disposed in proximity to the magnetic line, the guidance system will cause the component to be moved through the machine in a straight line until such time as the probe again encounters the magnetic line.

Alternative forms of probe may be used. For example, a third magnetic head may be included in order to control the operations carried out along the line along which the machine, such as the sewing machine, is guided. For example the third magnetic head may sense control signals magnetically recorded on the workpiece which cause the machine to start and stop sewing at required positions. This third head may generate a continuous signal whose frequency may be used to control the feed speed, or to act as a reference for further information signals. As a further alternative, guidance of the workpiece through the machine may be achieved by a single magnetic head in which case it would be preferable for there to be recorded on the workpiece a pair of parallel magnetic lines or areas defining between them a non-magnetic line, and the guidance apparatus arranged to operate so that the head is maintained in register with its non-magnetic line. To facilitate this, the two magnetic lines or areas may be distinguishable from one another, for example by being recorded at different frequencies or by comprising carriers of a common frequency modulated with different modulation frequencies or other distinguishable signals, so that the apparatus can sense the direction in which the workpiece has to be moved to maintain the head in its proper position in relation to the two lines as the workpiece is guided through the machine.

If desired, starting and stopping of the operation carried out on the workpiece, such as sewing, could be achieved by providing on the workpiece a magnetic line in the form of dashes so as to produce intermittent sewing. Where this same line is to be used for guidance of the workpiece, the guidance mechanism of the machine may be constructed so that in the absence of the line the workpiece continues to move in a straight line through the machine.

In the case of a sewing machine, the drive to the needle can be independent of the drive mechanism for moving the workpiece through the machine; for example, the sewing mechanism could be solenoid operated.

Reference has been made above to starting and stopping the sewing operation in response to information recorded on the workpiece. Variation in the sewing operation other than starting and stopping, such as stitch length or stitches per unit length, can also be controlled.

The system may be refined by using recorded signals having more than one distinct value, or range of values, of signal amplitude or frequency. For example, if sections of a recorded line are alternatively formed by signals of two values, the detector output signals will also be distinguishable. Such signals can be used to operate distinct functions of the guidance mechanism or the machining device or to provide one function to two degrees. Thus, in sewing, one signal can cause the workpiece to be guided without being sewn whereas the second signal can cause simultaneous guidance and sewing. In this way an intermittent seam, or a set of seams in different areas of the workpiece, can be produced without manual transposition from one seam to the other. It is usually more convenient to vary signal frequency; varying amplitude may lead to errors through spuriously low amplitude in some areas of a workpieces. Different materials, or batches of workpieces of the same material may also have differing responses to the range of recording signal levels used, necessitating adjustment of the recording signal strength to provide output signals in the correct amplitude ranges. Three or more distinct signals may be used in complex applications so that several operations can be carried out along one line, or one operation carried out to various degrees for example the degree of roughing or depth of embossing.

In order to eliminate manual introduction of the workpiece to the machine, or orientation by hand to position the detector at the start of the recorded line, several techniques are possible. A recorded signal line having one value that will operate the guidance function may be run from the edge of the workpiece to the start of a signal line having a differing value that will operate the machining function. The guidance mechanism may be arranged to rotate the workpiece until a detector scanning the edge coincides with the start of the guidance line, whereupon the events previously described are brought into play and the material is guided and machined. This system inherently allows the handling of randomly shaped pieces. A system may also be used whereby magnetic areas or dots on the workpiece require to be aligned with suitable detectors (or magnets) in the machine before the guidance and machining operations can start.

Where two or more workpieces require to be brought together and machined at a common line or area, for example two workpieces joined by sewing, each can be separately guided by a system of the type previously described. It may be necessary to separate the guidance lines and detectors to prevent the magnetic lines and corresponding output signals from interfering with each other. This can be done by arranging the magnetic line on one or both workpieces to be parallel or concentric with the line of the seam or other operation, rather than coincident with this line. The plane of one guidance system may be slightly above that of the other so that the workpieces are overlapped in the correct sense. Alternatively, the detectors and guidance mechanisms may be in different non-parallel planes, the (flexible) workpieces being fed in the directions of these planes and brought together and machined in a third plane. In many joining processes two or more workpieces may be temporarily attached to each other e.g. by temporary seams, staples or adhesive spots, and a single guidance system used to pass the entity through the machine and provide the permanent attachment. Thus components of shoe uppers or similar assemblies may be temporarily attached to each other by a simple machine or by unskilled labour, and later permanently combined by a sewing machine having a single guidance and control system of the type already described.

The signal recorded on the workpiece as described with reference to the drawings is an AC signal. This is preserved in the magnetic coating along the recorded line. Movement of a detector head along the line thus generates an AC output signal. As an alternative, DC signal could be recorded, an output signal being produced by the probe when the detector moves across the recorded line. A pulsed signal, giving a broken magnetic line or dots of magnetism can also be used if desired as mentioned.

The output signal strength may be from 0.01 to 100 mV with the types of coatings described earlier the usual signal strength is 0.05 to 1mV. The quality of signal reproduction need not be as high as that expected in audio-recording where signals of many frequencies must be faithfully reproduced. Hence imperfections in the coating or signal recording leading to variation in signal strength of up to 20% may be tolerable. This enables cheaper materials and simpler equipment to be used. Moderate amounts of spurious signals or "noise" may also be tolerated, providing an adequate signal noise ratio is maintained.

Also alternative guiding mechanisms may be used. One alternative is illustrated in FIGS. 9 and 10 of our aforesaid co-pending application. Another alternative would be to mount the workpiece in a jig or supporting frame which can be moved in two directions at right angles by suitable means, such as pneumatic cylinders, or stepping motors.

An alternative method to the use of a mechanical drive for moving the workpiece through the machine is to employ a linear motor type drive, which is possible since the workpiece comprises magnetic material. Thus, effectively the workpiece would be drawn through the machine by electromagnetic forces.

ALTERNATIVE PROCESSES AND EMBODIMENTS

In the process illustrated in FIG. 1, the cutting out of the components from the sheet material prepared at step 2 has been carried out at step 4 in advance of the printing step. As an alternative, the cutting operation could be carried out subsequent to the printing step 6. In that case, a cutting tool controlled by magnetic lines recorded in the sheet material at the printing step may be used. Thus, it is within the scope of the invention that operations to be performed by different machines can all be controlled by information or lines recorded magnetically on the workpiece. For example, the cutting tool may be designed to repond to magnetic lines of one frequency and the swing machine guidance machanism desinged to respond to magnetic lines of a different frequency, so that the lines to be cut and the lines to be sewn are distinguishable from each other.

The invention is also useful in assisting the manual guiding of a workpiece through a machine, for example for training operatives in the use of a particular machine. In this case, the output of the magnetic probe, instead of being supplied to a servo-loop as described with reference to FIGS. 10 and 11, may be supplied to an indicating device, for example a visible indication, for example having a moving pointer, or an audible indicator so as to modulate, for example amplitude or frequency modulate, the audible signal to indicate to the operative that the required line is not being properly followed. If, for example, the indicator provides an audible tone, the frequency thereof may be caused to increase with deviation from the line in one direction and decrease with deviation from the line in the opposite direction.

The embodiments so far described in detail have been in connection with guiding workpieces through a machine. The invention is also applicable to the guidance of machines over a surface, for example trucks may be guided over a floor within the scope of the invention, such as in a warehouse. In this case, the magnetic coating would be provided on or in the floor material and magnetic lines defining the path or paths which the truck or trucks should follow recorded thereon. As in the embodiments illustrated in the drawings, control instructions may also be recorded for causing operations to be automatically carried out by or in the trucks, for example automatic unloading.

It should also be clearly understood that, within the shoe industry, the invention has wide application. In addition to controlling sewing and cutting, it may be used to control skiving, beading, roughing, embossing, eyeletting, or the applicaton of adhesive. Furthermore, it may be applied widely in other industries, especially industries in which such operations are to be carried out on leather or similar material.

Also it should be understood that guidance is not an essential feature of the invention in its braodest aspect: the recorded data may represent other control instructions or a machine in which guidance is effected by other means.

SPECIFIC EXAMPLES

The invention is illustrated by the following examples.

EXAMPLE 1

Magnetic spray coatings were prepared according to formulations I, II, III, IV as follows, all quantities being parts by weight (g).

|  | I | II | III | IV |
| --- | --- | --- | --- | --- |
| Acicular gamma ferric oxide MO−4031[1] | 40 | 40 | 40 | 40 |
| PVC-PVA copolymer resin Vinylite VAGH[2] | 10 | 15 | 15 | 30 |
| MEK (methyl ethyl ketone) | 315 | 315 | — | — |
| MIBK (methyl isobutyl ketone) | 35 | 35 | 350 | 350 |

[1]Pfizer Limited, Sandwich, Kent
[2]Union Carbide Plastic Co.

In each case the ferric oxide and PVC-PVA resin were blended with 100g of the mixed solvent (MBK + MIBK). The mixture was then ball-milled using ½in. (1.2 cm) diameter steel balls for 8 hours. At the end of this time the remaining solvent was added and the mixture ball-milled for a further 1 hour. The formulations were sprayed onto the unfinished grain surface of shoe upper leather to give a dry coating weight of 15 g/m². The appearance of the coatings was as follows:

I Rough surface texture, rather low in flexibility (cracking on flexing)

II rough surface texture

III Smoother surface (slower drying spray due to replacement of MEK by less volatile MIBK) especially when ironed at 150° C. to consolidate the binder resin.

IV Acceptably smooth surface when ironed (higher resin content).

Magnetic lines were recorded on the coated leather using a 670 ohm coil containing a soft iron core. Soft iron pole pieces connected to the core tapered to a width of 0.7 mm at an air gap of approximately 0.005 in. (0.12 mm). An alternating current (30v; 50 Hz) was passed through the coil as the air gap was drawn over the coating surfaces at about 2 cm/sec. Detection of the induced magnetism was by means of a tape-recording head connected through an amplifier to an oscilloscope. The head was drawn along the magnetised lines at about 10 cm/sec. The signal detected in all cases was 0.2–0.4 mV, generally 0.25–0.3 mV. The signal from the coating of high resin formulation (IV) was not noticeably less than from the other coatings.

EXAMPLE 2

Magnetic coatings of formulation III of Example 1 were sprayed onto leather and onto a sheet of plasticised PVC (Bostik 9503) both materials being previously split to 1 mm thickness. The dry coating weight in each case was increased to approximately 50 g/m². The recording coil described in Example 1 was used to produce lines of magnetism in the coatings. a higher recording voltage was used so that the detected signal in the coatings was 3–5 mV. These master recordings were placed in face-to-face contact with leather coated with formulations III or IV of Example 1, but carrying no prerecorded signal. A 500 ohm coil having a soft iron core and flat soft iron pole pieces with a 5 mm air gap was drawn across the contacted materials at 1 cm/sec. When no current was passed through the coil no induced signals could subsequently be detected in the unrecorded coated leather. When 100 v, 50 Hz was passed through the coil transferred signals of 0.1–0.2 mV were subsequently detected by the detector described in Example 1. The detected signals were coincident with lines on the coatings that had been in contact with the lines prerecorded on the master materials. When a master carrying no prerecorded signal was contacted with unrecorded coated leather and the same transfer field applied, no induced signal was detected.

EXAMPLE 3

A sample of shoe upper leather was treated with solvents to remove the pre-existing finishes. The leather was then re-finished using a black tannery finishing system. This comprised two padded-on acrylic emulsion coats, two sprayed-on acrylic emulsion coats, and two sprayed-on solvent based nitrocellulose coats. The same leather was then refinished with the same system except that an additional magnetic coat (formulation III of Example 1, dry weight 15 g/m²) was interposed between the first two coats.

A sample of unfinished shoe upper leather (corrected grain crust side, Harris Bros. (Rushden) Limited) was treated with one padded-on yellow emulsion coat, two sprayed-on yellow emulsion coats, sprayed-on clear emulsion coat, sprayed-on clear solvent based lacquer coat and sprayed-on black "rub-off" solvent based lacquer. Plating with a hot iron was carried out after 1, 3, 4. The same leather was finished with the same system with a magnetic coat (as above) interposed between the first two coats. Plating with a hot iron was carried out after coats 1, 2 (magnetic) 4 and 5.

These leathers were referenced A, B, C, D respectively; B and D were according to the invention and A and C were control samples.

A master recording as described in Example 2 was contacted with each leather and the moving transfer field of Example 2 was applied. On leathers B and D a signal of 0.1–0.2 mV could be detected.

The appearance of each leather was assessed and standard SATRA tests carried out on the leather finishes. The results are summarised as follows:

| Test | Test Results | | | |
|---|---|---|---|---|
| | A | B | C | D |
| Appearance | Satisfactory | Less smooth than A, less gloss | Satisfactory | Satisfactory, not distinguishable from C |
| Adhesion of finish dry | 630 g/cm | 640 g/cm | 400 g/cm | 230 g/cm |
| Adhesion of finish wet | 250 g/cm | 250 g/cm | 400 g/cm | 400 g/cm |
| Flexing of finish dry | 2 adverse points | 2 adverse points | 3 adverse points | 3 adverse points |
| Flexing of finish wet | 3 adverse points | 1–2 adverse points | 4 adverse points | 3 adverse points |
| Rub fasteners dry | rating 1 | rating 1 | rating 1 | rating 4 |
| Rub fasteners wet | rating 2 | rating 1 | rating 2 | rating 4 |

These results show that presence of the magnetic layer had a small random effect on the properties of the leather finish. In no case did failure occur at the magnetic layer or in such a way as to expose this layer.

EXAMPLE 4

Figure 12:
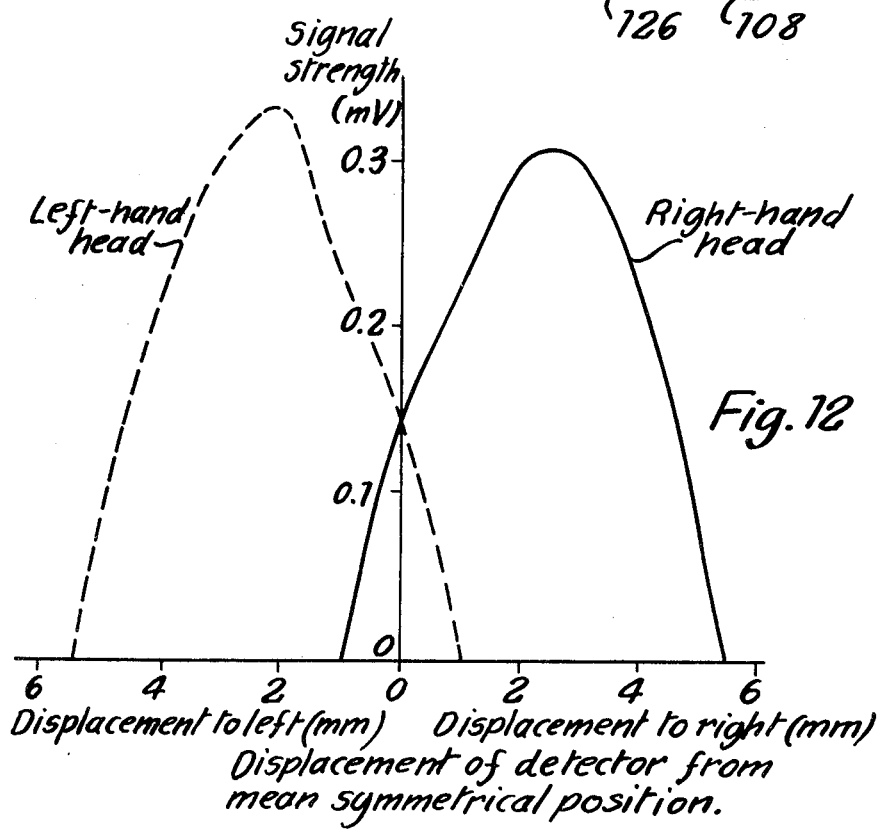
FIG. 12 is a graph illustrating the response characteristics of a pick-up according to an example of the invention.

A sample of leather was prepared identical with sample D of Example 3. A straight magnetic line was recorded on the leather using the recording coil of Example 1. The recorded signal was detected by a twinheaded detector having the centers of the two air-gaps laterally separated by approximately 4 mm. The detector was symmetrically placed astride the recorded line with the air gaps perpendicular to the line of the plain of the leather. On moving the detector along the line signals of similar strength were obtained from each head. The head was then moved laterally in either directions by increments of 1 mm and the signal strengths again noted. A plot of signal strength against head displacement is shown in FIG. 12.

EXAMPLE 5

A twin headed detector of the type described in Example 4 was connected into the circuit shown in FIG. 10. The alternating signals from the heads were rectified, combined and amplified, and the resulting signal used to control a servo motor in the manner describe with reference to FIGS 10 and 11. A sewing machine was arranged as described so that workpiece material was fed to the sewing foot by twin wheels with their planes parallel and axes co-linear; the wheels are connected by a differential gearbox and driven by a constant speed motor, the servo motor was arranged to act on the differential so that one of the wheels was speeded up or slowed down relative to the normal speed which latter speed was maintained by the other wheel, all as described and illustrated in FIGS. 1 to 5 of our aforesaid co-pending application referred to in the description herein of FIGS. 10 and 11. Speeding up or slowing down occurred according to the polarity of the output of the circuit in FIG. 10. This in turn depended on the difference (if any) between the signals received by the detector heads.

The detector heads 120, 122 were arranged to scan material driven through the sewing machine by the twin wheels. The heads were situated close to the points of contact of the wheels and material, with the central axis between the heads midway between and parallel to the planes of the wheels. A sample of leather identical with sample D of Example 3 was provided with a line of magnetism by the process of Example 2. When driven through the sewing machine the signals from this line were detected and operated the servo motor in the manner already described. This caused the material to be driven through the machine so that the recorded line was kept close to the axis of the detector.

It is to be understood that the invention has a number of different aspects. Thus, the invention resides in a method of producing workpieces, or material from which workpieces are made, having magnetic material therein; workpieces and workpiece material so produced; methods of recording information on said workpieces or workpiece material; the workpiece or workpiece material with said information recorded thereon; a machine for carrying out operations on the workpiece under control of or in response to said information; methods of controlling such machines; and articles produced on such machines or by such methods.

We claim:

1. A method of controlling a machine carrying out machine operations on a workpiece along a predetermined path on a surface portion of said workpiece, said workpiece including magnetic material in an area substantially coextensive with said surface portion, said method comprising:
   selectively magnetizing said material to record control instructions thereon;
   moving said workpiece through said machine so that said machine operations are carried out along said path;
   detecting said selective magnetization during said movement to produce control signals; and
   utilizing said control signals to control said machine.

2. A method of guiding a workpiece through a work station on a machine so that a machine operation is carried out on the workpiece on successive portions thereof along a predetermined path, comprising:
   providing a layer of magnetic material in fixed relation to a surface portion of said workpiece, said layer being substantially coextensive with said surface portion;
   selectively magnetizing said layer to form thereon a guideline which defines said path;
   moving said workpiece towards said work station;
   detecting said selective magnetization during said movement to provide a signal dependent upon said detection; and
   utilizing said signal to control the guiding of said workpiece along said path.

3. A method according to claim 2, wherein said line is continuous.

4. A method according to claim 2, wherein said line comprises a line of discrete magnetised areas.

5. A method according to claim 2, wherein said line is created by an electromagnetic transducer having a circular air gap and to which alternating current is supplied.

6. A method according to claim 5, wherein said line is created directly on said layer by said transducer.

7. A method according to claim 5, wherein said line is first created by said transducer as a master pattern on a magnetic member and is subsequently recorded on said layer using said master pattern.

8. A method according to claim 2, including providing along said line of magnetisation additional data representing control operations to be carried out on said machine during guiding thereof relative to the guide line.

9. A method according to claim 8, wherein said line is produced by an alternating magnetic field, and said additional data is produced by modulating said alternating field.

10. A method according to claim 2, wherein said selective magnetising comprises providing at least one first line representative of control operations to be carried out on a first said machine and at least one second line distinguishable from said first line and representative of control operations to be carried out on a different said machine.

11. A method according to claim 2, wherein said signals are supplied to automatic control means responsive thereto for controlling said operations.

12. A method according to claim 2, wherein said signals are supplied to an indicator providing an indication to an operative for controlling said operations.

13. A method according to claim 2, wherein said signals are supplied to automatic guidance means operable to control said workpiece movement in response to said line of magnetisation.

14. A method according to claim 2, wherein said signals are supplied to an indicator providing an indication to an operator to control said workpiece movement along said guide line.

15. A method according to claim 2, wherein said detecting is carried out by means of first and second transducers positioned on opposite sides of said line of magnetisation.

16. A method according to claim 2, wherein said selective magnetisation comprises at least first and second magnetised areas having spaced apart parallel edges defining between them a non-magnetised area in the form of a line, and said detecting is carried out by a transducer positioned adjacent said non-magnetised line.

17. A method according to claim 16, wherein said first and second magnetised areas are themselves each in the form of lines.

18. A method according to claim 2, wherein said surface is the surface of a workpiece to be moved through said machine.

19. A method according to claim 18, wherein said workpiece is a piece of shoe upper material.

20. A method according to claim 19, wherein said material is leather.

21. A method according to claim 20, wherein said magnetic layer is provided beneath a surface layer of said leather.

22. A method according to claim 20, wherein said magnetic layer is incorporated in a surface layer of said leather.

23. A method according to claim 19, wherein said material is a synthetic shoe upper material.

24. A method according to claim 23, wherein said layer is incorporated in a bonding layer bonding a surface plastics film to a fabric backing.

25. A method according to claim 18, wherein said selective magnetising is carried out by firstly recording said information magnetically on a magnetic master element and then transferring said data from said element to said workpiece.

26. A method according to claim 25 comprising transferring said information from said master to a plurality of workpieces.

27. A method according to claim 25, wherein said transfer is effected by bringing said workpiece and said master into close proximity and applying an alternating magnetic field to said master and said workpiece.

28. A method according to claim 18, wherein said selective magnetisation is in the form of at least one line representing a guide line for said relative movement.

29. A method according to claim 2, wherein said magnetic layer comprises particles of magnetic material in a binder.

30. A method according to claim 29, wherein the layer comprises 10 to 90% by weight of magnetic material and 90 to 10% by weight of binder.

31. A method according to claim 29, wherein the dry weight of said layer is 1 to 50 g/m$^2$.

32. A method according to claim 31, wherein the dry weight is 10 to 20 g/m$^2$.

33. A method according to claim 2, wherein the layer of magnetic material is in the form of a film.

34. A method according to claim 33, in which the film is removable.

35. A method according to claim 33, in which the film incorporates a paper substrate.

36. A method according to claim 2, wherein said workpiece is a laminar workpiece of irregular shape and said layer of magnetic extends substantially over the whole of said workpiece.

37. A method according to claim 2, wherein said guideline is coincident with said path on which said machine operation is carried out.

38. A method according to claim 2, wherein said guideline is spaced from but parallel to said path along which said machine operation is carried out.

39. A method according to claim 2, wherein said machine operation is a stitching operation.

40. A method of controlling a machine carrying out machine operations on a workpiece along a predetermined path on a surface portion of said workpiece, said method comprising:
   providing a layer of magnetic material in fixed relation to said surface portion, said layer being substantially coextensive with said surface portion;
   selectively magnetizing said layer to record control instructions thereon;
   moving said workpiece through said machine so that said machine operations are carried out along said path;
   detecting said selective magnetization of said layer during said movement to produce control signals; and
   utilizing said control signals to control said machine operations.

41. A method according to claim 40, wherein the workpiece material is leather and said leather is tanned with a tanning agent incorporating magnetic material, said magnetic material being dispersed in said leather during said tanning.

42. A method according to claim 40, wherein said magnetic material is incorporated by a drumming operation.

43. A method of guiding a workpiece through a work station so that a machine operation is carried out on the workpiece on successive portions thereof along a predetermined path, said workpiece including magnetic material in an area substantially coextensive with a surface portion thereof, said method comprising:
   selectively magnetizing said material to form thereon a guideline which defines said path;
   moving said workpiece towards said work station;
   detecting said selective magnetization during said movement to provide a signal dependent upon said detection; and
   utilizing said signal to control the guiding of said workpiece along said path.

44. A method according to claim 43, wherein said machine operation comprises joining said workpiece to a further workpiece.

* * * * *